United States Patent
Weerappuli et al.

(10) Patent No.: US 9,511,734 B2
(45) Date of Patent: Dec. 6, 2016

(54) PASSENGER PROTECTION SYSTEM

(71) Applicant: Ford Global Technologies, LLC, Dearborn, MI (US)

(72) Inventors: Parakrama V. Weerappuli, West Bloomfield, MI (US); James Chih Cheng, Troy, MI (US); Raed Essa EL-Jawahri, Northville, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,717

(22) Filed: Jan. 29, 2015

(65) Prior Publication Data

US 2016/0221525 A1 Aug. 4, 2016

(51) Int. Cl.
*B60R 21/08* (2006.01)
*B60R 21/00* (2006.01)

(52) U.S. Cl.
CPC ........ *B60R 21/08* (2013.01); *B60R 2021/0009* (2013.01)

(58) Field of Classification Search
CPC ...... B60R 21/232; B60R 21/214; B60R 21/06; B60R 2021/0253; B60R 2021/23161; B60R 2021/0273
See application file for complete search history.

(56) References Cited

U.S. PATENT DOCUMENTS

| | | | |
|---|---|---|---|
| 2,025,822 A * | 12/1935 | Pryor | B60R 21/08 280/749 |
| 3,633,936 A | 1/1972 | Huber | |
| 4,130,298 A * | 12/1978 | Shaunnessey | B60R 21/013 280/729 |
| 4,569,534 A * | 2/1986 | Nalbandyan | B60N 2/4221 180/274 |
| 5,462,308 A | 10/1995 | Seki et al. | |
| 5,707,075 A * | 1/1998 | Kraft | B60R 21/23138 280/730.2 |
| 5,839,757 A * | 11/1998 | von Lange | B60R 21/06 280/749 |
| 6,315,323 B1 * | 11/2001 | Pack, Jr. | B60R 21/233 280/735 |
| 6,378,897 B1 * | 4/2002 | Butters | B60R 21/23184 280/728.2 |
| 6,598,921 B2 * | 7/2003 | Seel | B60R 21/06 160/291 |
| 7,416,211 B2 * | 8/2008 | Bannon | B60R 21/0134 280/749 |
| 7,464,962 B2 * | 12/2008 | Hakansson | B60R 21/08 280/749 |
| 8,562,018 B1 * | 10/2013 | Wantin | B60R 21/232 280/730.2 |

(Continued)

FOREIGN PATENT DOCUMENTS

| | | |
|---|---|---|
| JP | H07291084 | 11/1995 |
| JP | 2005001412 | 1/2005 |
| JP | 2013166535 | 8/2013 |

*Primary Examiner* — Darlene P Condra
(74) *Attorney, Agent, or Firm* — Frank MacKenzie; Bejin Bieneman PLC

(57) ABSTRACT

A passenger protection system includes a rotatable arm, a rotation mechanism rotatably attached to the rotatable arm, and a flexible sheet connected to the rotatable arm and connectable to a vehicle roof.

21 Claims, 8 Drawing Sheets

(56) References Cited

U.S. PATENT DOCUMENTS

| | | | |
|---|---|---|---|
| 8,596,673 B2* | 12/2013 | Ruedisueli | B60R 21/21 |
| | | | 280/730.2 |
| 8,814,202 B2 | 8/2014 | Matsushita et al. | |
| 2001/0033073 A1* | 10/2001 | Hammond | B60R 21/06 |
| | | | 280/730.2 |
| 2004/0256841 A1* | 12/2004 | Bakhsh | B60R 21/02 |
| | | | 280/730.1 |
| 2005/0035577 A1* | 2/2005 | Barko | B60R 21/33 |
| | | | 280/730.2 |
| 2005/0225060 A1* | 10/2005 | Wold | B60R 21/213 |
| | | | 280/728.2 |
| 2006/0043706 A1 | 3/2006 | Kosugi et al. | |
| 2006/0192367 A1* | 8/2006 | Zumpano | B60N 2/286 |
| | | | 280/730.1 |
| 2007/0045999 A1* | 3/2007 | Saberan | B60R 21/213 |
| | | | 280/730.2 |
| 2007/0164581 A1* | 7/2007 | Ehrenberger | B60R 21/06 |
| | | | 296/37.16 |
| 2008/0018080 A1* | 1/2008 | Siewiera | B60R 21/20 |
| | | | 280/728.2 |
| 2010/0025972 A1* | 2/2010 | Nezaki | B60R 21/18 |
| | | | 280/730.1 |
| 2011/0285115 A1* | 11/2011 | Putala | B60R 21/213 |
| | | | 280/730.2 |
| 2011/0291393 A1* | 12/2011 | Nakamura | B60R 21/213 |
| | | | 280/730.2 |
| 2013/0334799 A1* | 12/2013 | Suga | B60R 21/06 |
| | | | 280/730.2 |
| 2014/0110923 A1* | 4/2014 | Maita | B60R 21/213 |
| | | | 280/730.2 |
| 2014/0375033 A1* | 12/2014 | Fukawatase | B60R 21/214 |
| | | | 280/729 |

\* cited by examiner

PASSENGER PROTECTION SYSTEM

BACKGROUND

Oblique impacts in a vehicle may be defined as impacts that occur at an angle of 10-50 degrees relative to the vehicle's trajectory. During an oblique impact, occupants of the vehicle typically move forward and laterally with respect to a length of the vehicle. Improved systems are needed for absorbing crash energy during an oblique impact.

DETAILED DESCRIPTION

Figure 1:
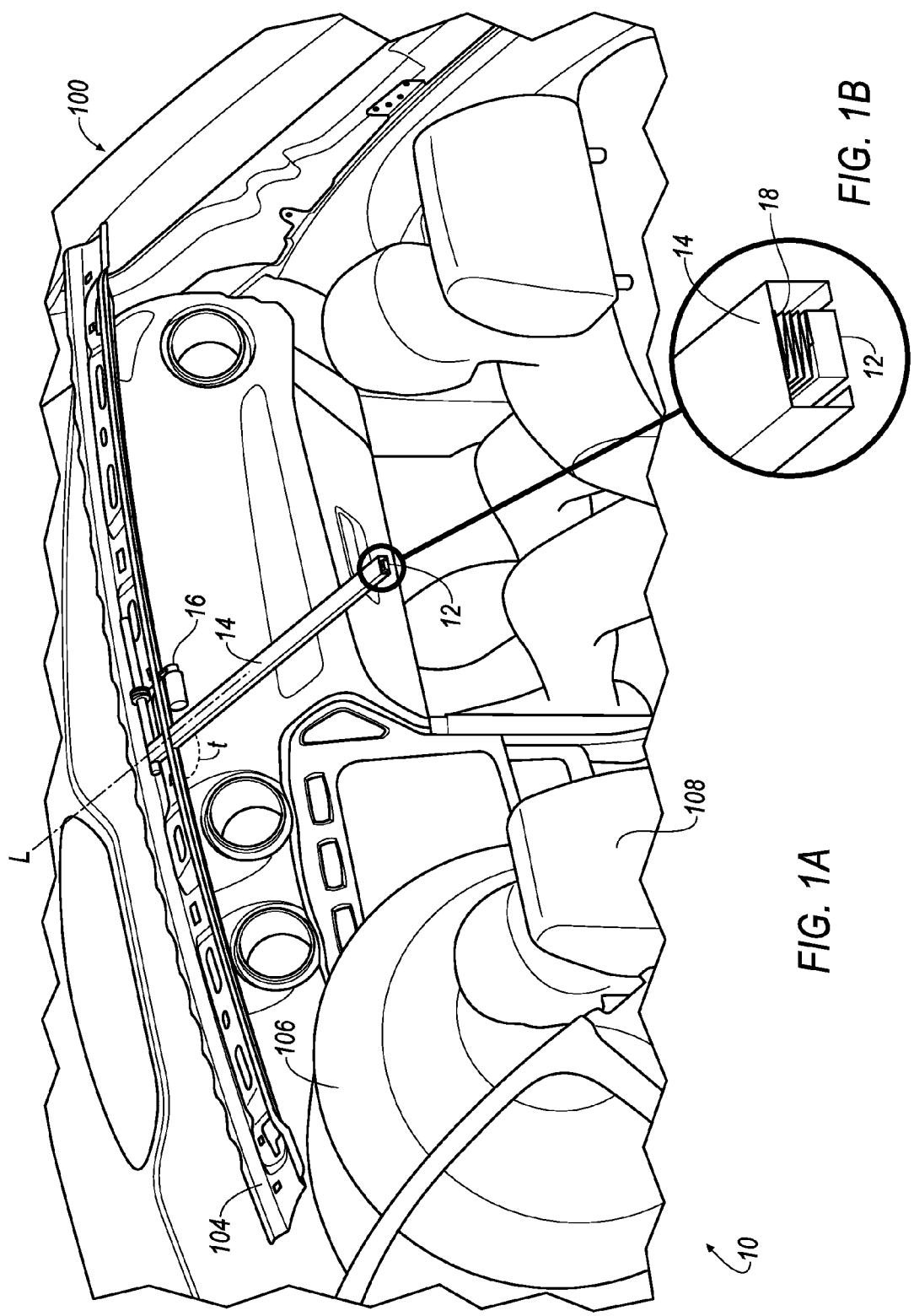
FIG. 1A is a perspective view of an example of a passenger protection system in an undeployed state.
FIG. 1B is a magnified view of a portion of the passenger protection system.

With reference to the Figures, wherein like numerals indicate like parts throughout the several views, a passenger protection system 10 for a vehicle 100 includes a rotatable arm 12, a base 14 attachable to a vehicle roof 102, a rotation mechanism 16 rotatably attached to the rotatable arm 12, and a flexible sheet 18 connected to the rotatable arm 12. During an oblique impact, a controller 64 included in an impact sensing sub-system 60 activates a triggering mechanism 62, which causes actuation of the rotation mechanism 16, deploying the flexible sheet 18. The flexible sheet 18 is then positioned to receive an occupant moving laterally with respected to a longitudinal axis L of the vehicle 100, thereby absorbing impact energy from the occupant.

As shown in FIG. 1A, the rotation mechanism 16 connects the rotatable arm 12 to the base 14. The rotation mechanism 16 may be attached at a suitable mounting location, e.g., to a roof support 104 in the vehicle roof 102. During the oblique impact, the rotation mechanism 16 rotates the rotatable arm 12 to a deployed state, deploying the flexible sheet 18 such that the flexible sheet 18 can receive the occupant.

The rotatable arm 12 may be rotatably connected to the rotation mechanism 16, i.e., connected to the rotation mechanism 16 in such a way that rotation of the rotation mechanism 16 causes rotation of the rotatable arm 12. The rotatable arm 12 may be constructed of any suitable material, e.g., a rigid polymer or a metal. During the oblique impact, the rotatable arm 12 rotates from an undeployed state to the deployed state. In the undeployed state, the rotatable arm 12 may be adjacent to the roof support 104, i.e., close to or substantially in contact with the roof support 104, in the vehicle roof 102. The rotatable arm 12 may extend substantially along or parallel to the longitudinal axis L of the vehicle 100, e.g., at an angle t 70-90 degrees relative to the vehicle roof support 104, when in the undeployed state. The rotatable arm 12 may be located on or in the vehicle roof 102, e.g., substantially flush with, or beneath a surface of, e.g., generally covered by a fabric, leather, etc. roof cover of the vehicle roof 102. During the oblique impact, the rotatable arm 12 typically remains stationary, but may absorb energy from the occupant in any suitable manner, e.g., deforming, bending, twisting, breaking, etc. The rotatable arm 12 may pivot during the oblique impact, changing the angle t to accommodate the direction of the impact.

Figure 2:
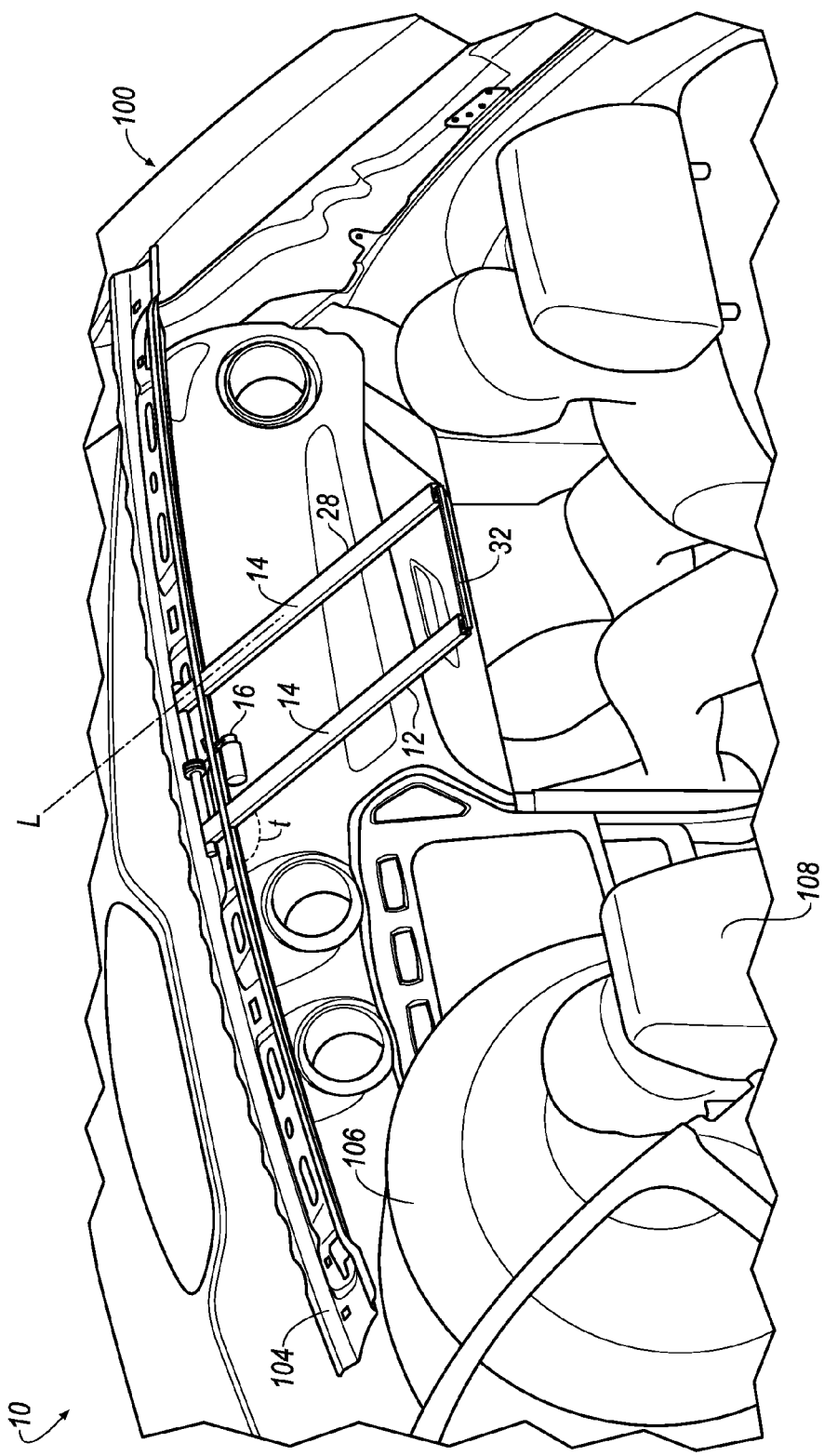
FIG. 2 is a perspective view of a second example of a passenger protection system in an undeployed state.

As shown in FIG. 2, the passenger protection system 10 may further include a second arm 28 and a second flexible sheet 30. The rotation mechanism 16 is attached to each of the rotatable arm 12 and the second arm 28, rotating both upon triggering of the triggering mechanism 62. The flexible sheet 18 attached to the rotatable arm 12 may deploy in a position to receive an occupant, e.g., a driver, during an impact, while the second flexible sheet 30 attached to the second arm 28 may deploy in a position to receive another occupant, e.g., a passenger, during the impact. The passenger protection system 10 may further include a connecting arm 32 connecting the rotatable arm 12 and the second arm 28. During the oblique impact, the rotatable arm 12 and the second arm 28 typically remain stationary, but may absorb energy in any suitable manner, e.g., deforming, bending, twisting, breaking, etc.

The base 14 may house the rotatable arm 12 in the undeployed state, as shown in FIG. 1B. The base 14 may be attachable to the vehicle roof 102. For example, the base may be fixedly attached to the vehicle roof 102, and the rotatable arm 12 may be substantially flush with, or beneath surface of, e.g., generally covered by a fabric, leather, etc. roof cover of, the vehicle roof 102. The base 14 may be constructed out of any suitable material, e.g., a rigid polymer, a metal, etc. During the oblique impact, the base 14 typically remains stationary as the rotatable arm 12 rotates into the deployed state, as shown in FIGS. 3 and 4, but may absorb energy in any suitable manner, e.g., deforming, bending, twisting, breaking, etc.

Figure 3:
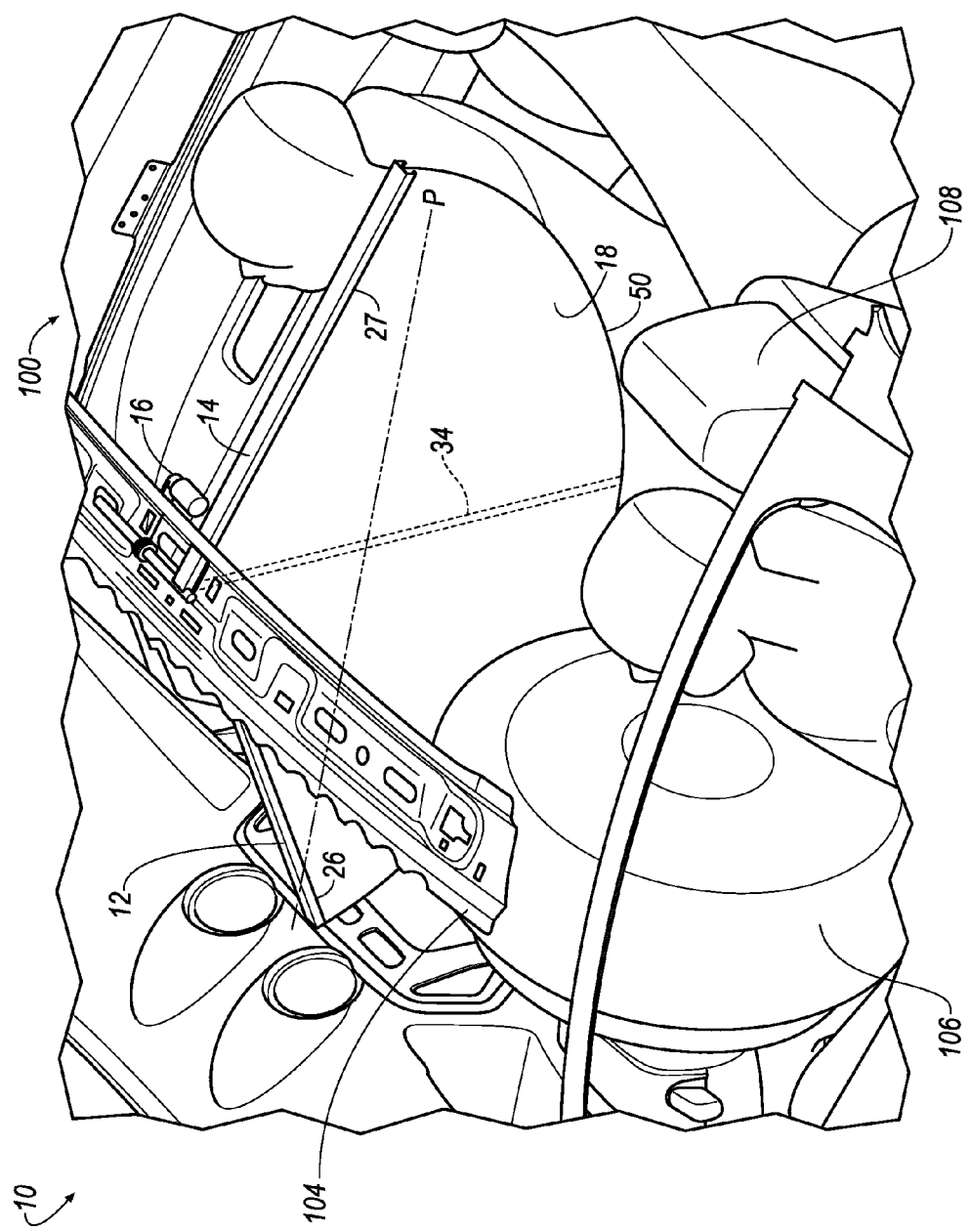
FIG. 3 is a perspective view of the passenger protection system of FIG. 1 in a deployed state.
Figure 4:
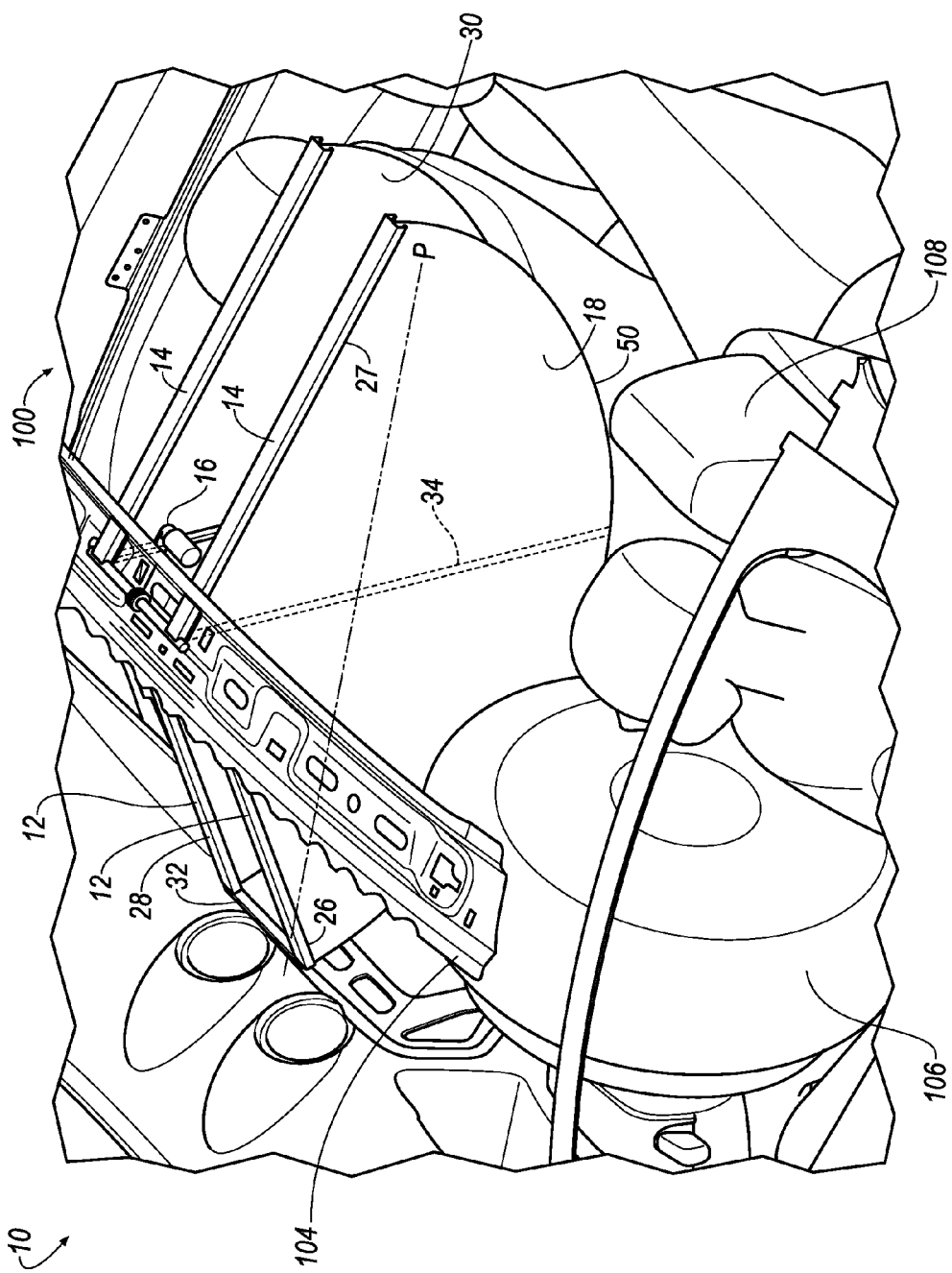
FIG. 4 is a perspective view of the passenger protection system of FIG. 2 in the deployed state.

The flexible sheet 18, as mentioned above, is arranged to receive the occupant during an oblique impact when the flexible sheet 18 is in the deployed state, as shown in FIGS. 3 and 4. The flexible sheet 18 has an edge 26 attached to the rotatable arm 12 and a second edge 27 attached to the base 14. In the undeployed state, the flexible sheet 18 may be stored between the rotatable arm 12 and the base 14. During the oblique impact, the flexible sheet 18 may extend from the rotatable arm 12 to the base 14 to deploy to a position to receive an occupant. The flexible sheet 18, the rotatable arm 12, and the base 14 may substantially define a plane P in the deployed state. In an embodiment, the flexible sheet 18 may tautly extend between the rotatable arm 12 and the base 14 below a vehicle headrest 108 in a deployed state, forming an impact surface for the occupant. The term "tautly" as used herein means that the flexible sheet 18 extends with substantially no slack between the rotatable arm 12 and the base 14. However, even when taut, the flexible sheet 18 may, e.g., due to the nature of flexible material used for the flexible sheet 18, e.g., an elastic polymer or fabric, typically has some ability to flex or give, to thereby absorb energy, e.g., when the flexible sheet 18 is impacted by an object such as a human head or other body part.

The flexible sheet 18 may include a reinforcing member 34, as shown in FIGS. 3 and 4. The reinforcing member 34 is attached to the flexible sheet 18 and provides structure to the flexible sheet 18 in the deployed state. In particular, the flexible sheet 18 may have an arcuate bottom edge 50 in a deployed state, and the reinforcing member 34 may maintain the arcuate shape of the bottom edge 50 when in the deployed state. The reinforcing member 34 may be constructed of any suitable material that will provide structure, e.g., a rigid polymer, a metal, etc. During the oblique impact, the flexible sheet 18 extends from the rotatable arm 12 to the base 14 to receive the occupant.

Figure 7:
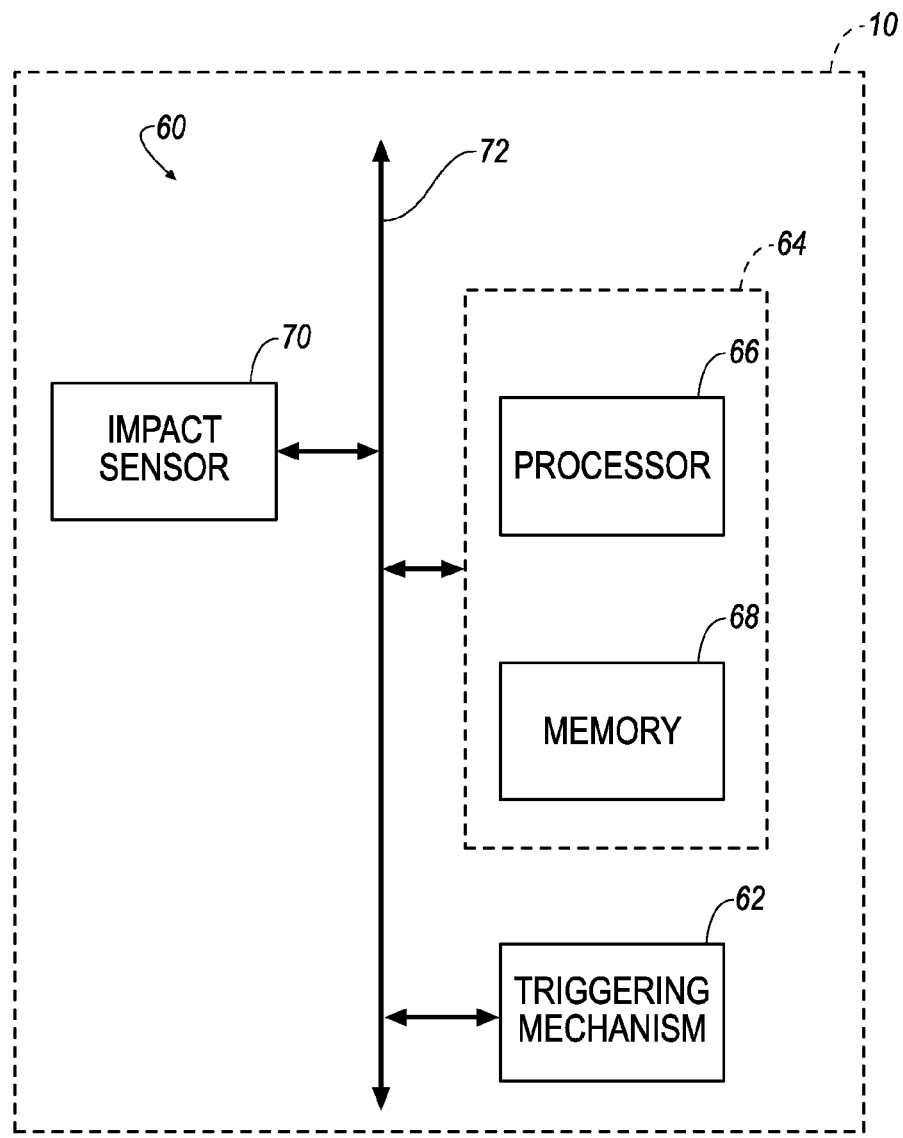
FIG. 7 is a block diagram of an impact sensing sub-system for the passenger protection system.
Figure 8:
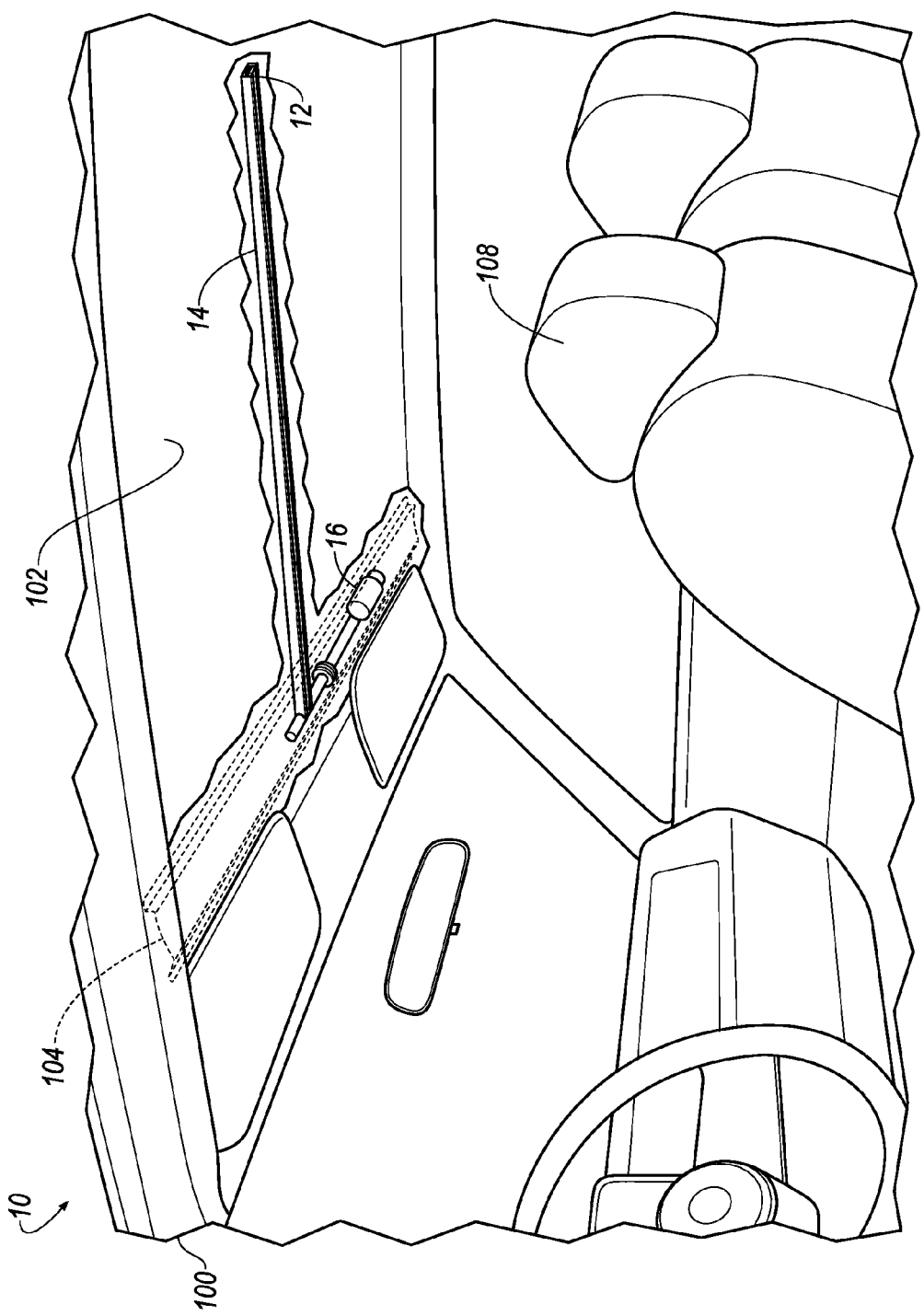
FIG. 8 is a perspective view of the passenger protection system of FIG. 1 in the undeployed state.

The passenger protection system 10 typically includes a triggering mechanism 62 as part of the impact sensing sub-system 60, as shown in FIG. 7. The rotation mechanism 16 can be arranged to hold the rotatable arm 12 in the undeployed state until triggering of the triggering mechanism 62. When triggered, the triggering mechanism 62 causes the rotatable arm 12 to rotate about an axis A of the rotation mechanism 16 into the deployed state. The triggering mechanism 62 allows the passenger protection system 10 to rapidly deploy during the impact.

Figure 5:
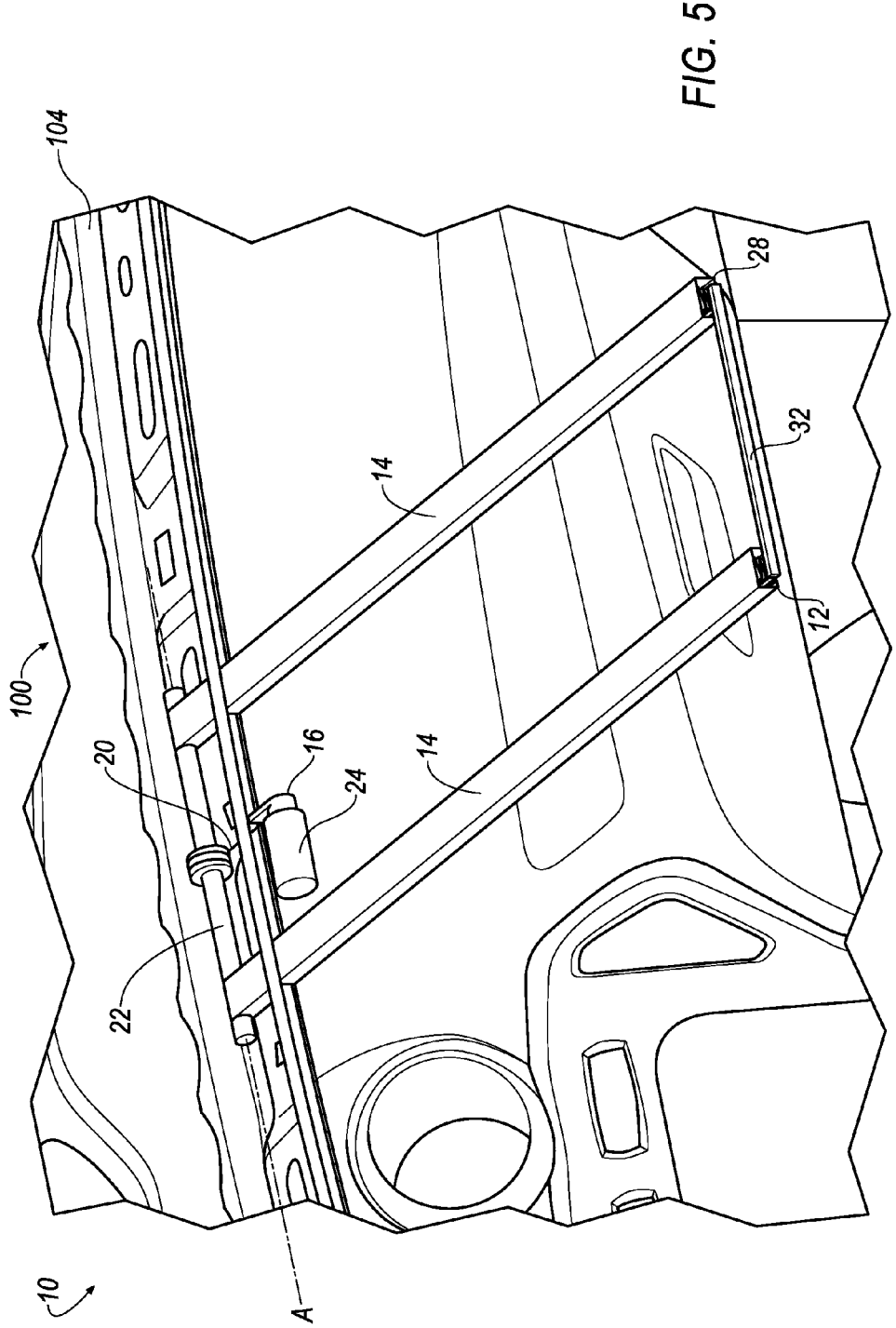
FIG. 5 is a detailed perspective view of a rotation mechanism for use in a passenger protection system.

The rotation mechanism 16 may be a pretensioner, as shown in FIG. 5. The pretensioner may include a piston 24, a shaft 22, and a cable 20. Further, the triggering mechanism 62 may be an ignitable charge. The shaft 22 is connected to the rotatable arm 12, and the cable 20 connects the piston 24 to the shaft 22. When triggered, the ignitable charge is ignited, moving the piston 24, which extends the cable 20, rotating the shaft 22 and the rotatable arm 12 into the deployed state. The use of the pretensioner allows for rapid deployment of the passenger protection system 10.

Alternatively, the rotation mechanism 16 may include other known mechanisms, such as an electric motor or a rotatable spring tightened and locked with a lock pin. The electric motor may be attached to the rotatable arm 12 and rotate upon triggering of the triggering mechanism 62, moving the rotatable arm 12 into the deployed state. The rotatable spring may be attached to the rotatable arm 12 and rotate the rotatable arm 12 when the triggering mechanism 62 releases the lock pin, releasing the rotatable spring and rotating the rotatable arm 12 into the deployed state.

Figure 6:
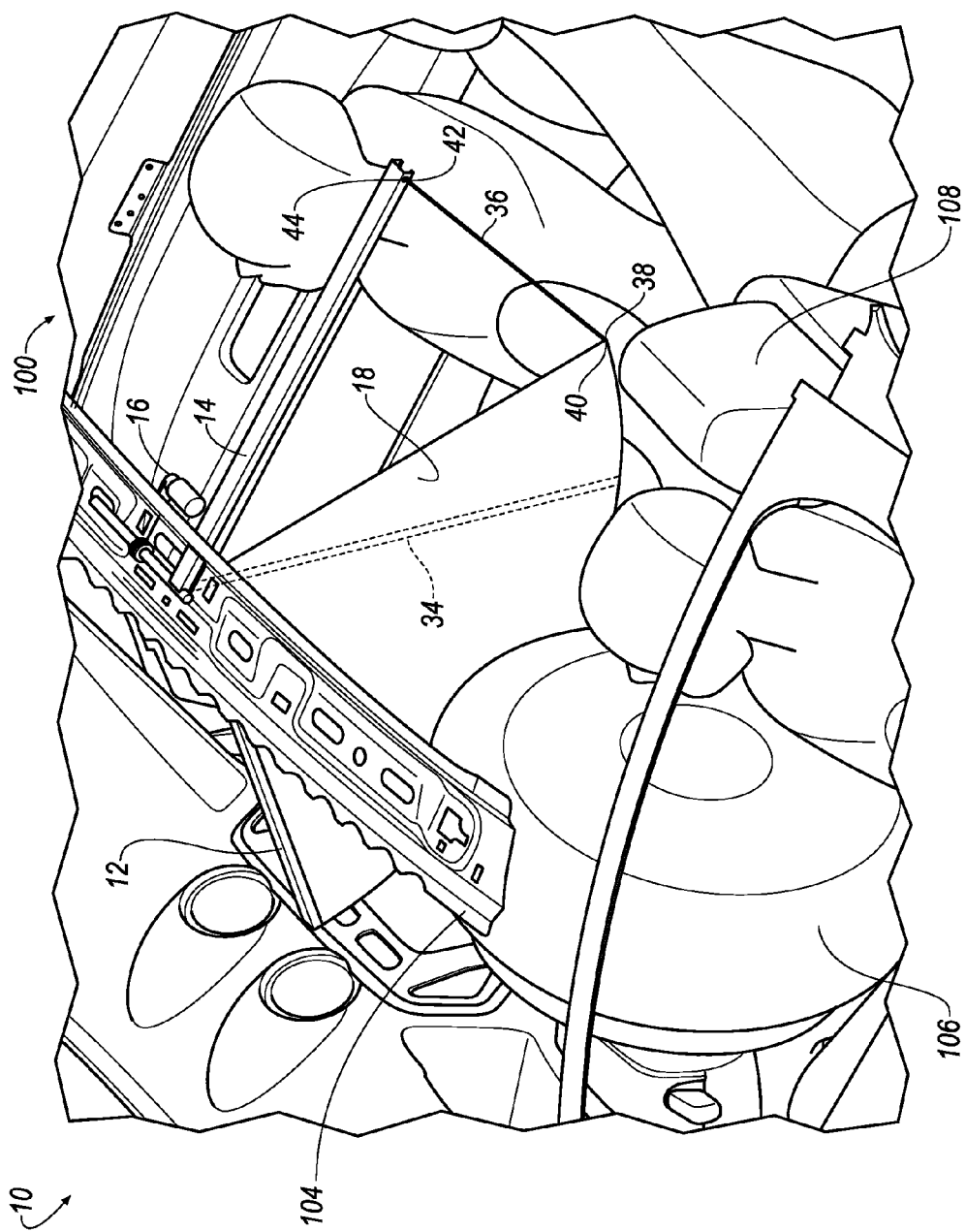
FIG. 6 is an example of a passenger protection system including tethers in the deployed state.

As shown in FIG. 6, the passenger protection system 10 may include at least one tether 36. The tether 36 may be attached at a first end 38 to an attachment point 40 on the flexible sheet 18 and connectable at a second end 42 at an anchor point 44 to at least one of the rotatable arm 12, the base 14, the vehicle roof support 104, and the vehicle roof 102. The tether 36 may be substantially non-elastic along its length, and may be of any suitable construction, e.g., a flexible polymer or fabric thread. The tether 36 extends the flexible sheet 18 in the deployed state, allowing further customization of the size and shape of the flexible sheet 18. For example, the tether 36 may connect to the flexible sheet 18 below the vehicle headrest 108, allowing for the flexible sheet 18 to be constructed to save packaging space.

The passenger protection system 10 generally includes an impact sensing sub-system 60, as stated above, and as is illustrated in FIG. 7. The controller 64 of the impact sensing sub-system 60 generally includes a processor 66 and a memory 68. The memory 68 stores instructions executable by the processor 66 to identify an oblique impact, e.g., as is known. The controller 64 is generally further programmed to, upon identifying the oblique impact, cause triggering of the triggering mechanism 62, moving the passenger protection system 10 from the undeployed state to the deployed state.

An impact sensor 70 such as is known is typically in communication with the controller 64 to communicate data to the controller 64. The impact sensor 70 may be of any suitable type, e.g., using accelerometers, radar, lidar, and/or a vision system. The vision system may include one or more cameras, CCD image sensors, and/or CMOS image sensors, etc. Based on data communicated by the impact sensor 70, the controller may cause triggering the triggering mechanism 62.

Communications between the controller 64, the impact sensor 70, the triggering mechanism 62, and or other components in the vehicle 100, may be connected to a communication bus 72, such as a controller area network (CAN) bus or the like, of the vehicle 100. The controller 64 may use data from the communication bus 72 such as is known to control the triggering of the triggering mechanism 62. The triggering mechanism 62 may be connected to the controller 64 or may be connected to the communication bus 72, as shown in FIG. 7.

Based on data collected by the impact sensing sub-system 60, the rotatable arm 12 may pivot during the oblique impact, adjusting the angle t to accommodate the impact and absorb energy from the occupant.

The vehicle 100 may include an airbag 106. In the deployed state, the flexible sheet 18 and the airbag 106 may contact one another, providing a continuous impact surface for the occupant during the oblique impact. The continuous impact surface may receive the occupant from several directions, absorbing crash energy.

The rotatable mechanism 16 may be disposed in any suitable vehicle component, including but not limited to a vehicle seat, a vehicle roof 102, an instrument panel, a console, a package tray, and/or a headrest 108. A portion of at least one rotatable arm 12 may be attached to the rotatable mechanism 16 in any suitable manner to allow rotation of the rotatable arm 12. The flexible sheet 18 generally has some of all of an edge 26, attached to the rotatable arm 12 in any suitable manner, e.g., bonded, held in place by crimping or clamping, and/or sewn, etc., to allow the flexible sheet 18 to extend when the rotatable arm 12 is rotated. The flexible sheet 18 may extend tautly, i.e., with substantially no slack, when the rotatable arm 12 is rotated. At least one tether 36 may be arranged to attach the flexible sheet 18 to any suitable attachment point 40, including but not limited to a vehicle component, the rotatable arm 12, the base 14, and/or the rotatable mechanism 16.

As used herein, the adverb "substantially" means that a shape, structure, measurement, quantity, time, etc. may deviate from an exact described geometry, distance, measurement, quantity, time, etc., because of imperfections in materials, machining, manufacturing, installation, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A passenger protection system, comprising:
   a rotatable arm;
   a rotation mechanism rotatably attached to the rotatable arm; and
   a flexible sheet connected to the rotatable arm and connectable to a vehicle roof;
   wherein the rotation mechanism is directly mounted to the vehicle roof and arranged to deploy the flexible sheet from an undeployed state to a deployed state.

2. The system of claim 1, further comprising a triggering mechanism arranged to cause the rotatable arm to rotate about an axis of the rotation mechanism, thereby placing the system in the deployed state.

3. The system of claim 2, wherein the rotation mechanism comprises a pretensioner that includes a piston, a shaft connected to the rotatable arm, and a cable connecting the piston to the shaft, wherein the triggering mechanism is an ignitable charge that, when ignited, moves the piston, thereby extending the cable and rotating the shaft.

4. The system of claim 1, further comprising a tether having a first end connected to an attachment point on the flexible sheet and a second end attached to an anchor point on the vehicle roof.

5. The system of claim 1, further comprising a base connected to the vehicle roof, wherein the flexible sheet is connectable to the base.

6. The system of claim 5, further comprising a tether having a first end connected to an attachment point on the flexible sheet and a second end attached to an anchor point on one of the base and the vehicle roof.

7. The system of claim 1, further comprising a reinforcing member attached to the flexible sheet, wherein the flexible sheet has a bottom edge having an arcuate shape and the reinforcing member is arranged to maintain the arcuate shape in the deployed state.

8. The system of claim 1, further comprising a second rotatable arm and a second flexible sheet, the flexible sheet being attached to the first rotatable arm and the second flexible sheet being attached to the second rotatable arm.

9. The system of claim 8, further comprising a connecting arm connecting the first and second rotatable arms.

10. The system of claim 1, wherein the rotatable arm, the base, and the flexible sheet substantially define a plane in the deployed state.

11. A passenger protection system, comprising:
    a vehicle roof having a roof support;
    a base fixedly attached to the roof support;
    a rotatable arm;
    a rotation mechanism rotatably attached to the rotatable arm and directly mounted to the vehicle roof; and
    a flexible sheet connected to the base and the rotatable arm;
    wherein the rotation mechanism is arranged to deploy the flexible sheet from an undeployed state to a deployed state.

12. The system of claim 11, further comprising a triggering mechanism, the base being arranged to hold the rotatable arm in an undeployed state until triggering of the triggering mechanism causes the rotatable arm to rotate about an axis of the rotation mechanism, thereby placing the system in the deployed state.

13. The system of claim 12, wherein the rotation mechanism comprises a pretensioner that includes a piston, a shaft connected to the rotatable arm, and a cable connecting the piston to the shaft, wherein the triggering mechanism is an ignitable charge that, when ignited, moves the piston, thereby extending the cable and rotating the shaft.

14. The system of claim 11, further comprising a second rotatable arm, the flexible sheet being attached to the rotatable arm and a second flexible sheet being attached to the second rotatable arm.

15. The system of claim 14, further comprising a connecting arm connecting the rotatable arm to the second rotatable arm.

16. The system of claim 11, further comprising a tether having a first end attached to an attachment point on the flexible sheet and a second end attached to an anchor point on at least one of the base, the roof support, and the vehicle roof.

17. The system of claim 11, further comprising an airbag, wherein the flexible sheet contacts the airbag in the deployed state.

18. The system of claim 11, further comprising a reinforcing member attached to the flexible sheet, wherein the flexible sheet has an arcuate bottom edge and the reinforcing member is arranged to maintain the arcuate bottom edge in the deployed state.

19. The system of claim 11, wherein the rotatable arm, the base, and the flexible sheet substantially define a plane in the deployed state.

20. The system of claim 11, wherein the flexible sheet extends below a vehicle headrest in the deployed state.

21. A passenger protection system, comprising:
    a rotatable arm;
    a rotation mechanism rotatably attached to the rotatable arm;
    a flexible sheet connected to the rotatable arm and connectable to a vehicle roof;
    a second rotatable arm and a second flexible sheet, the flexible sheet being attached to the first rotatable arm and the second flexible sheet being attached to the second rotatable arm; and
    a connecting arm connecting the first and second rotatable arms.

* * * * *